(12) United States Patent
Bayoumi

(10) Patent No.: US 11,192,648 B1
(45) Date of Patent: Dec. 7, 2021

(54) AIR BLOWING DRONE AND DUST CLEANING DEVICE FOR SOLAR PANELS

(71) Applicant: King Abdulaziz University, Jeddah (SA)

(72) Inventor: Mohannad Bayoumi, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/458,936

(22) Filed: Aug. 27, 2021

(51) Int. Cl.
| | |
|---|---|
| *B64C 39/02* | (2006.01) |
| *B08B 13/00* | (2006.01) |
| *B64D 47/08* | (2006.01) |
| *B60L 50/60* | (2019.01) |
| *F24S 40/20* | (2018.01) |
| *G05D 1/00* | (2006.01) |
| *G05D 1/10* | (2006.01) |
| *G06K 9/00* | (2006.01) |

(Continued)

(52) U.S. Cl.
CPC .............. *B64C 39/024* (2013.01); *B08B 5/02* (2013.01); *B08B 13/00* (2013.01); *B60L 50/60* (2019.02); *B64D 47/08* (2013.01); *F24S 40/20* (2018.05); *G05D 1/0094* (2013.01); *G05D 1/102* (2013.01); *G06K 9/00637* (2013.01); *H02S 40/10* (2014.12); *B60L 2200/10* (2013.01); *B64C 2201/027* (2013.01); *B64C 2201/042* (2013.01); *B64C 2201/108* (2013.01); *B64C 2201/127* (2013.01); *G06K 2209/21* (2013.01)

(58) Field of Classification Search
CPC ........ B64C 39/024; H02S 40/10; F24S 40/20; B60L 50/60; B08B 5/02; B08B 13/00; B64D 47/08; G05D 1/0094; G05D 1/102; G06K 9/00637

USPC .......................................................... 134/18
See application file for complete search history.

(56) References Cited

U.S. PATENT DOCUMENTS

| | | |
|---|---|---|
| 9,555,897 B2 | 1/2017 | Eline et al. |
| 9,963,230 B2 | 5/2018 | Borman et al. |

(Continued)

FOREIGN PATENT DOCUMENTS

| | | |
|---|---|---|
| CN | 106877238 A | 6/2017 |
| CN | 206392517 U | 8/2017 |
| JP | 2018-111474 A | 7/2018 |

(Continued)

OTHER PUBLICATIONS

"Patented Drone Cleaning Method", Aerial Power, https://www.aerialpower.com/, 2021, 3 pages.

(Continued)

*Primary Examiner* — Peter D Nolan
*Assistant Examiner* — Luke Huynh
(74) *Attorney, Agent, or Firm* — Oblon, McClelland, Maier & Neustadt, L.L.P.

(57) ABSTRACT

A rotary-wing drone and a method of blowing air by an air blowing device integrated with the rotary-wing drone are described. The rotary-wing drone includes a plurality of rotary propellers, an extendable cone, a centrifugal propeller unit, and one or more batteries, in the air blowing device. The rotary-wing drone further includes a camera configured to obtain images of surrounding environment of the rotary-wing drone, and a processing circuitry configured to analyze the images to determine dust characteristics on a solar panel and to obtain one or more parameters of the air blowing device and the rotary-wing drone, to enable the rotary-wing drone to clean the solar panel.

20 Claims, 10 Drawing Sheets

(51) Int. Cl.
   *H02S 40/10* (2014.01)
   *B08B 5/02* (2006.01)

(56) References Cited

U.S. PATENT DOCUMENTS 10,046,857 B2   8/2018   Azaiz
10,618,652 B2   4/2020   Tamkin, Sr.

FOREIGN PATENT DOCUMENTS

WO   WO 2019/215756 A1   11/2019
WO   WO 2019/221467 A1   11/2019

OTHER PUBLICATIONS

Hao Lu, et al., "Effects of particle sizes and tilt angles on dust deposition characteristics of a ground-mounted solar photovoltaic system," Applied Energy, vol. 220(C), Jun. 2018, pp. 514-526 (Abstract only).
Yu Jiang, et al., "Analyzing wind cleaning process on the accumulated dust on solar photovoltaic (PV) modules on flat surfaces," Solar Energy, vol. 159, Jan. 1, 2018, pp. 1031-1036 (Abstract only).
Hiroyuki Kawamoto, et al., "Electrostatic Cleaning Device for Removing Lunar Dust Adhered to Spacesuits," Journal of Aerospace Engineering, vol. 25, Issue 3, Jul. 2012, pp. 470-473 (Abstract only).

AIR BLOWING DRONE AND DUST CLEANING DEVICE FOR SOLAR PANELS

BACKGROUND

Technical Field

The present disclosure is directed to a rotary-wing drone with an air blowing device, and a method of blowing air by the air blowing device integrated with the rotary-wing drone for the purpose of, for example, cleaning a substrate such as a solar panel.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Dust, including dirt from winds and organic matter, such as bird droppings, tends to accumulate on any exposed outdoor surface. In case of solar panels, the dust that accumulates on an outer surface of the solar panel attenuates the solar radiation that impinges on energy conversion elements (such as solar cells) located below the outer surface of the solar panel, thereby reducing the efficiency of the solar panels. Further, the dust accumulation leads to hot spots and panel heating which have an impact on the efficiency and working life of the solar panels. Efficiency loss is estimated to 10-15% but can go up to 30-40% in dry and sandy climates. Thus, regular cleaning of the solar panels is an essential part of maintenance practices required to maintain a designated power output from the installed solar panels. However, conventionally employed manual cleaning techniques for the solar panels are highly laborious, costly, and time-consuming, and thus impractical for large installations with hundreds or thousands of solar panels.

Some installations employ automated cleaning systems which use treated water for cleaning of the solar panels. Such automated cleaning systems usually apply running water to the outer surface of the solar panel and may further utilize wipers and/or brushes to wash the solar panel. Such systems consume large amount of water, which is not desirable and may not be practical for regions with water scarcity. Further, such systems, may demand the use of treated water since untreated (regular tap) water includes dissolved minerals which may deposit (scale) over the outer surface of the solar panel after evaporation of the untreated water. The required water treatment process for such systems in itself may be expensive and an additional burden.

WO2019221467A1 describes a solar power generation operating server having a manager terminal to monitor solar module-specific solar power generation amount for solar modules, and if a solar module having a solar power generation amount that is deficient in comparison to a set reference power generation amount exists, use a drone for unmanned flight to move to a position of such solar module and spray one or more of water pressure and air pressure to the upper surface of the solar module to clean the solar module.

CN206392517U describes a utility model claiming a household solar photovoltaic vehicle cleaning device. The device includes a control device, a propeller, and a gas nozzle, in which the control device connects the propeller and the gas nozzle for controlling the rotation of the propeller and switch of the gas nozzle, for the dirt clearing on photovoltaic panel.

U.S. Ser. No. 10/618,652B2 describes a surface washing drone with a modular cleaning head unit. The surface washing drone includes a body; at least four propellers coupled to the body; a central unit coupled to the body, wherein the central unit includes a processor, a fluid reservoir, a pump, and one or more sensors; and a drone head coupled to a front part of the body. The drone head includes a cleaning head, a squeegee, and one or more motors to control a plurality of spur gears that control the movements of the cleaning head and the squeegee.

CN106877238A describes a power line nest removing method, carried out using unmanned plane comprising a vehicle body, a bracket, a high pressure cylinder part, rotating part, balance part, removing part, a control part, and a ground vehicle device.

U.S. Ser. No. 10/046,857B2 describes a method for controlling a flying body for cleaning surfaces which consists of detecting the surrounding surfaces of an object to be cleaned, directing the flying body with respect thereto and structuring the flight path. This reference describes that cleaning of the surface can be performed using effectors on the flying body, for example a brush and/or the airflow generated by a rotor, and/or using an effector connected to the flying body via a mounting adapter.

JP2018111474A describes a method for a pilotless aircraft which is designed to considerably reduce a risk of crash solution. The reference provides that upon detection of emergency, a compressed air tank mounted in a drone causes a nozzle to inject compressed air toward ground so as to ensure landing at a decreased drop velocity.

Non-patent result 1 "Patented drone cleaning method" describes an aerial powered drone being self-flying and easing the maintenance of solar power plants.

Each of the aforementioned references suffers from one or more drawbacks hindering their adoption. For example, WO2019221467A1 utilizes a central server for confirming dirt accumulation over solar panels and thereby controlling drone for cleaning purposes, making the process infrastructure-intensive and complex. CN206392517U fails to disclose a means for confirming accumulation of dirt on solar panels, and must use complex gas nozzle sprays with control device are complicated in operation. U.S. Ser. No. 10/618,652B2 utilizes a squeegee on a drone head of the disclosed surface washing drone, and requires precise control over movement of such drone to implement the squeegee for dirt cleaning purposes on solar panels and the like, which may be difficult to achieve. CN106877238A fails to disclose a means for automatically confirming accumulation of dirt on solar panels and/or any specific means for cleaning dirt from solar panels. U.S. Ser. No. 10/046,857B2 provides that the airflow generated by the rotor of the flying body itself may be used for cleaning the surface, which may be inefficient. JP2018111474A utilizes a dedicated compressed air tank mounted in a drone to causes a nozzle to inject compressed air and is implemented to reduce a risk of crash, rather than for any cleaning purposes. Additionally, each of the aforementioned references fails to disclose an air blowing device for drone including an extendable cone having one or more truncated conical sections, and the centrifugal propeller unit surrounded by upper portions of one or more pillars; one or more batteries electrically connected to a motor and disposed between the centrifugal propeller unit and the bottom plate, of the present disclosure.

Accordingly, it is one object of the present disclosure to provide apparatuses and methods for cleaning of surfaces, such as solar panels, by blowing air using a device that may be integrated with a drone, and in which the drone is self-sufficient to confirm accumulation of dirt on solar panels and to carry out the cleaning operation efficiently.

SUMMARY

In an exemplary embodiment, a rotary-wing drone is described. The rotary-wing drone includes a central body portion, a plurality of rotary propellers mounted at a periphery of the central body portion, and an air blowing device configured to blow air downwardly from the rotary-wing drone when in flight. The air blowing device includes a top plate and a bottom plate. The top plate and the bottom plate are in a center portion of the central body portion of the rotary-wing drone. The bottom plate defines a first opening. The air blowing device further includes one or more pillars connecting the top plate and the bottom plate. The air blowing device further includes an extendable cone including one or more truncated conical sections. The one or more truncated conical sections are configured to nest such that a first section with a largest diameter is on the outside and a second section with a smallest diameter is on the inside when nested. The air blowing device further includes a centrifugal propeller unit mounted to the top plate. The centrifugal propeller unit includes a propeller and a motor configured to drive the propeller. The air blowing device further includes one or more batteries electrically connected to the motor and disposed between the centrifugal propeller unit and the bottom plate. The one or more batteries are surrounded by lower portions of the one or more pillars. The rotary-wing drone further includes a camera configured to obtain images of surrounding environment of the air blowing device and the rotary-wing drone and a processing circuitry configured to analyze the images to obtain one or more parameters of the air blowing device and the rotary-wing drone.

In some embodiments, each of the plurality of rotary propellers has a same diameter. In some embodiments, a first diameter of the top plate is the same as a second diameter of the bottom plate.

In some embodiments, the analyzing the images includes determining an amount of dust on a solar panel, a type of the dust on the solar panel, and quality of the dust on the solar panel.

In some embodiments, the one or more parameters include blowing angle of the air blowing device, blowing strength of the air blowing device, tilt angle of the rotary-wing drone, traveling direction of the rotary-wing drone, and traveling speed of the rotary-wing drone.

In some embodiments, the one or more pillars separate the top plate from the bottom plate. In some embodiments, each of the one or more pillars includes an upper portion and the lower portion. In some embodiments, a third diameter of the upper portion of each of the one or more pillars is larger than a fourth diameter of the lower portion of each of the one or more pillars. In some embodiments, the centrifugal propeller unit is surrounded by the upper portions of the one or more pillars.

In some embodiments, the one or more truncated conical sections form a cone shaped extension when extended. In some embodiments, the cone shaped extension is connected to the top plate and extends through the bottom plate.

In another exemplary embodiment, a method of blowing air by an air blowing device integrated with a rotary-wing drone is described. The method includes obtaining, by a camera, images of surrounding environment of the air blowing device and the rotary-wing drone. The method further includes analyzing, by a processing circuitry, the images to obtain one or more parameters of the air blowing device and the rotary-wing drone. The method further includes blowing, by the air blowing device, air downwardly from the rotary-wing drone when in flight based on the analysis. The air blowing device includes a top plate and a bottom plate. The top plate and the bottom plate are in a center portion of a central body portion of the rotary-wing drone. The bottom plate defines a first opening. The air blowing device further includes one or more pillars connecting the top plate and the bottom plate. The air blowing device further includes an extendable cone including one or more truncated conical sections. The one or more truncated conical sections are configured to nest such that a first section with a largest diameter is on the outside and a second section with a smallest diameter is on the inside when nested. The air blowing device further includes a centrifugal propeller unit mounted to the top plate. The centrifugal propeller unit includes a propeller and a motor configured to drive the propeller. The air blowing device further includes one or more batteries electrically connected to the motor and disposed between the centrifugal propeller unit and the bottom plate. The one or more batteries are surrounded by lower portions of the one or more pillars.

In some embodiments, the analyzing the images includes determining an amount of dust on a solar panel, a type of the dust on the solar panel, and quality of the dust on the solar panel. In some embodiments, the one or more parameters include blowing angle of the air blowing device, blowing strength of the air blowing device, tilt angle of the rotary-wing drone, traveling direction of the rotary-wing drone, and traveling speed of the rotary-wing drone.

In some embodiments, the one or more pillars separate the top plate from the bottom plate. In some embodiments, each of the one or more pillars includes an upper portion and the lower portion.

In some embodiments, a third diameter of the upper portion of each of the one or more pillars is larger than a fourth diameter of the lower portion of each of the one or more pillars.

In another exemplary embodiment, a rotary-wing drone is described. The rotary-wing drone includes a central body portion, a plurality of rotary propellers mounted at a periphery of the central body portion, and an air blowing device configured to blow air downwardly from the rotary-wing drone when in flight. The air blowing device includes a base being in a center portion of the central body portion of the rotary-wing drone. The air blowing device further includes an extendable cone mounted to the base. The extendable cone includes one or more truncated conical sections configured to nest such that a first section with a largest diameter is on the outside and a second section with a smallest diameter is on the inside when nested. The air blowing device further includes a centrifugal propeller unit on top of the base. The centrifugal propeller unit includes a propeller and a motor configured to drive the propeller. The air blowing device further includes one or more batteries electrically connected to the motor and disposed between the centrifugal propeller unit and the base. The rotary-wing drone further includes a camera configured to obtain images of surrounding environment of the air blowing device and the rotary-wing drone. The rotary-wing drone further includes a processing circuitry configured to analyze the images to obtain one or more parameters of the air blowing device and the rotary-wing drone.

In some embodiments, the base defines an opening for the extendable cone mounted on the base.

In some embodiments, the one or more parameters include blowing angle of the air blowing device, blowing strength of the air blowing device, tilt angle of the rotary-wing drone, traveling direction of the rotary-wing drone, and traveling speed of the rotary-wing drone.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
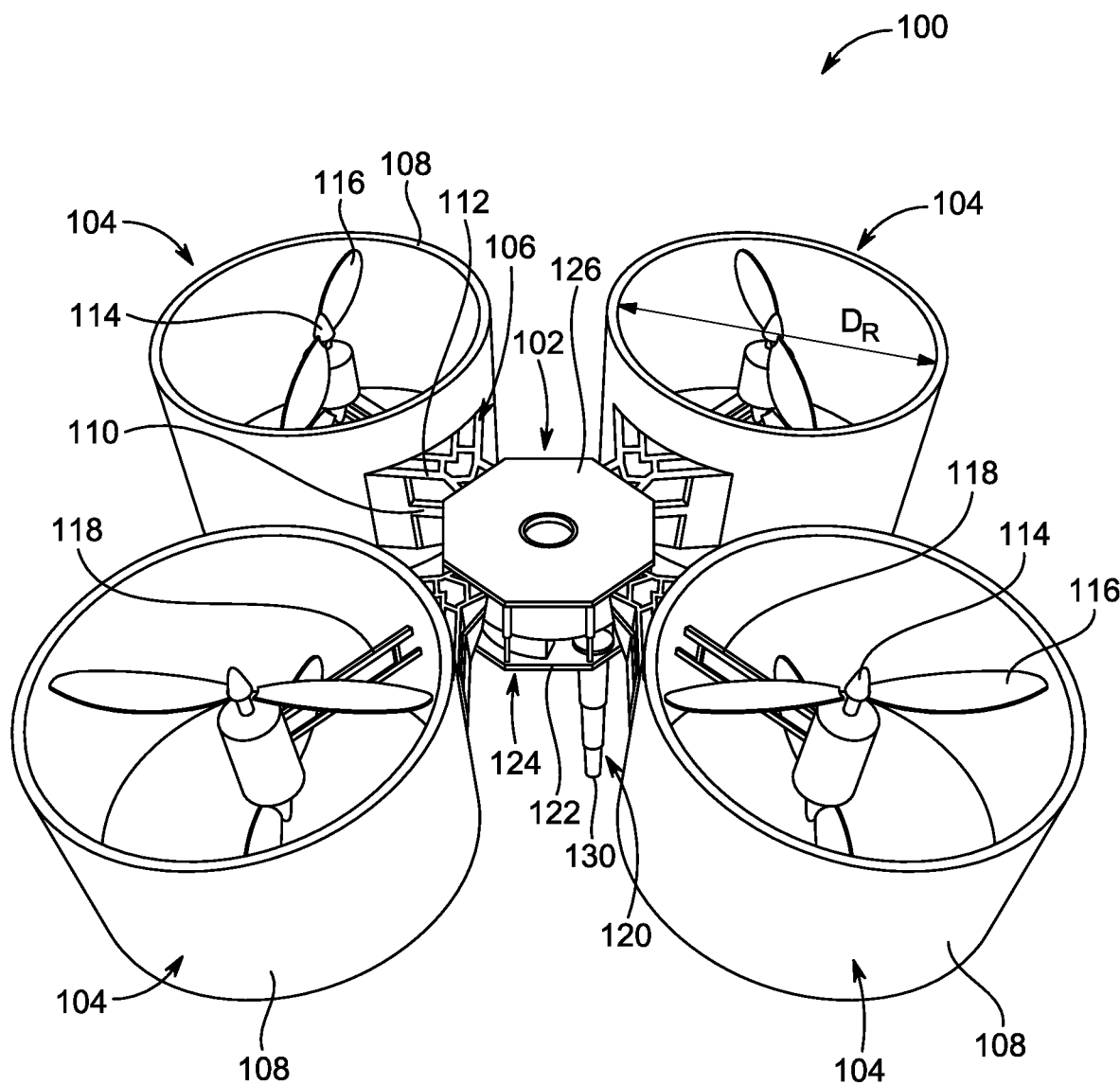
FIG. 1A is a top perspective view of a rotary-wing drone, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of the present disclosure are directed to a rotary-wing drone and a method of blowing air by an air blowing device integrated with the rotary-wing drone. The rotary-wing drone may be utilized for cleaning of surfaces, such as solar panels, by blowing air using the air blowing device integrated therewith. The rotary-wing drone incorporates a camera to obtain images of surrounding environment and processing circuitry configured to analyze the images to confirm accumulation of dirt on solar panels and to obtain one or more parameters of the air blowing device to be used by the rotary-wing drone for carrying out the cleaning operation efficiently.

Referring to FIG. 1A, a top perspective view of a rotary-wing drone 100 is illustrated. Further, referring to FIG. 1B, a bottom perspective view of the rotary-wing drone 100 is illustrated. The term "rotary-wing drone" is used herein to cover any known rotary-wing drone type, including drones with single-rotor configuration (usually with an anti-torque tail rotor), drones with banana-shaped twin-rotor configuration, drones with contra-rotating coaxial rotors configuration, and particularly drones with quadcopter or quadrotor configuration having four fixed-pitch coplanar rotors. Although the aspects of the present disclosure have been described in terms of the rotary-wing drone 100, in some examples, other suitable types of drones including a fixed-wing drone, or a powered-lift done may be utilized for the purposes of the present disclosure. In general, the term "rotary-wing drone" refers to any unmanned aerial vehicle capable of flight for extended periods of time, regardless of whether it is guided or supervised by a human or other system. The rotary-wing drone 100 may be fitted with numerous sensors (not shown), including, but not limited to, an inertial measurement unit, gyroscopes (rate gyros or free gyros), accelerometers, altimeters, Pitot tubes, global positioning system (GPS) receivers, and the like, for supporting its flight operation and automatically stabilizing hovering during flight, as may be required for the purposes of the present disclosure. The flight operations and various sensors of the rotary-wing drone 100 may be contemplated by a person skilled in the art and thus have not been described in detail herein for the brevity of the present disclosure.

Figure 1B:
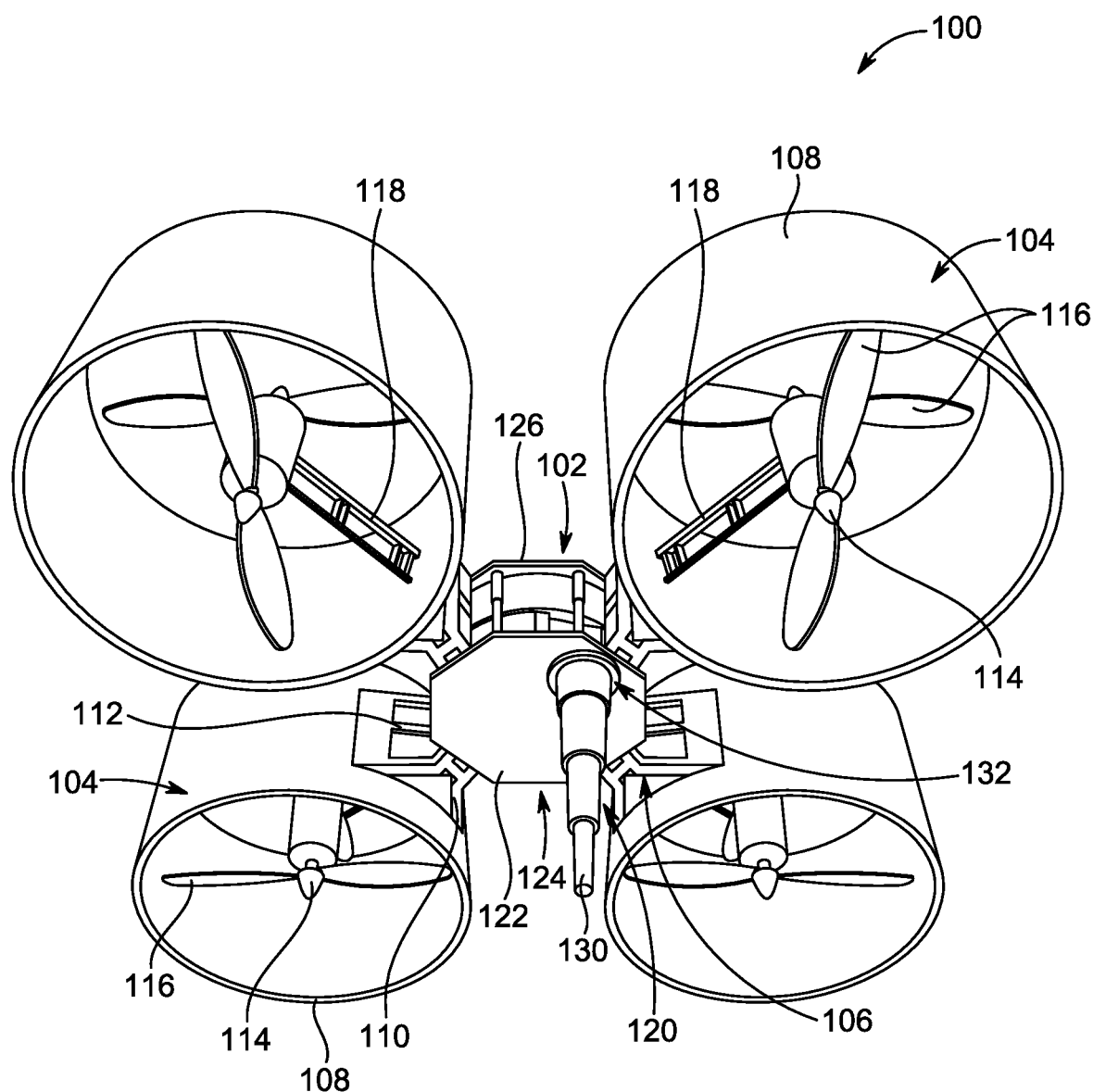
FIG. 1B is a bottom perspective view of the rotary-wing drone of FIG. 1A, according to certain embodiments.

As illustrated in FIG. 1A and FIG. 1B, the rotary-wing drone 100 includes a central body portion 102. The central body portion 102 may, generally, refer to a middle region of an overall span of the rotary-wing drone 100. The central body portion 102 may define a particular shape preferably an octagon (or volume) from which other components of the rotary-wing drone 100 may extend outwardly. The rotary-wing drone 100 also includes a plurality of rotary propellers 104 mounted at a periphery 106 of the central body portion 102. Preferably the rotary propellers 104 are mounted at a periphery 106 through linkages (e.g., truss 110) that connect to a flat vertical surface of the drone, e.g., the side faces that connect upper and lower octagons. The periphery 106 of the central body portion 102 may be defined by peripheral shape of component(s) located in the central body portion 102 (as will be discussed later) and may generally be circular in shape for the purposes of the present disclosure. In the present illustrations, the rotary-wing drone 100 is depicted to include four of rotary propellers 104 (e.g., rotary propeller units); however, it may be contemplated that, in other examples, more or fewer rotary propellers 104 may be employed without departing from the scope of the present disclosure. As may be seen, the rotary propellers 104 are arranged radially outward from the central body portion 102, in the rotary-wing drone 100. Generally, as depicted, the rotary propellers 104 may be arranged uniformly around the periphery 106 of the central body portion 102; however, some suitable non-uniform arrangements of the rotary propellers 104 may be employed. Further, the rotary propellers 104 may be arranged coplanar (as depicted) or in different plane with respect to the central body portion 102. For the purposes of the present disclosure, the term "rotary propeller" may include propellers of different configurations including those of ducted fans and rotors (such as helicopter rotors). In some embodiments, the term "rotary propeller" also includes impellers, albeit with few variations to the arrangement described herein.

In an aspect of the present disclosure, each of the plurality of rotary propellers 104 has a same diameter '$D_R$'. In particular, each of the rotary propellers 104 includes an outer housing 108. It may be appreciated that, in particular, the diameter '$D_R$' of each of the plurality of rotary propellers 104 is defined by an inner diameter (also represented as '$D_R$') of the respective outer housings 108; and the inner diameters of the outer housing 108 of each of the plurality of rotary propellers 104 is same (or, approximately equal). The outer housing 108 of each of the rotary propellers 104 may be connected to the component(s) located in the central body portion 102, to support the rotary propellers 104 in the rotary-wing drone 100. In particular, as shown, the rotary-wing drone 100 may include a plurality of truss structures 110 (each corresponding to the plurality of rotary propellers 104) extending radially outward from the central body portion 102. Particularly, each of the plurality of truss structures 110 extends between the central body portion 102 and the outer housing 108 of each of the rotary propellers 104. As illustrated, each of the truss structure 110 includes multiple ribs 112 configured to be connected to the outer housing 108 of the corresponding rotary propeller 104, to reinforce to the connection between the rotary propellers 104 and the component(s) located in the central body portion 102. Further, each of the rotary propellers 104 includes a central hub 114 and two or more blades 116. The blades 116 are mounted to the central hub 114, with the central hub 114 defining an axis of rotation for the blades 116 of the rotary propeller 104. Each of the rotary propellers 104 may also include a beam (preferably a single beam) 118 extending between an inner surface of the outer housing 108 and the central hub 114. The beam 118 may be extend from the inner surface of the outer housing 108 generally as an extension (in-line) with respect to the corresponding truss structure 110 connected to an outer side of the outer housing 108. Further, each of the rotary propellers 104 may include respective motors (identified in FIG. 3 as motors 302) that are driven independently to cause rotation of the respective blades 116. It will be understood that it is the rotation of the blades 116 of one or more rotary propellers 104 at any given instant which provides lift for causing the flight of the rotary-wing drone 100. Further, it will be understood that with independent rotation of the blades 116 (using respective motors 302 of FIG. 3), one or more of tilt angle of the rotary-wing drone 100, traveling direction of the rotary-wing drone 100, and traveling speed of the rotary-wing drone 100 may be controlled, as would be required for the purposes of the present disclosure.

The rotary-wing drone 100 further includes an air blowing device 120 configured to blow air in a direction downward, with respect to the central body portion 102, from the rotary-wing drone 100 when in flight. As such, the rotary-wing drone 100 is alternatively referred to as "air blowing drone". The air blowing device 120 may generally be located in the central body portion 102 of the rotary-wing drone 100. The air blowing device 120 includes a base 122 being in a center portion 124 of the central body portion 102. As used herein, the center portion 124 of the central body portion 102 may refer to a median region in the central body portion 102, defined by volume of the air blowing device 120. Further, the air blowing device 120 includes a cover 126 located in the center portion 124 of the central body portion 102, generally co-axial to the base 122. Preferably, the base 122 and the cover 126 may be planar surfaces which define an extent of the center portion 124 in the central body portion 102. The other components of the rotary-wing drone 100, including the rotary propellers 104, may be supported by a physical connection to one or both of the base 122 and/or the cover 126 in the center portion 124 of the central body portion 102, in the rotary-wing drone 100.

As better seen in FIG. 1B, the air blowing device 120 includes an extendable cone 130 mounted to the base 122. Further, as may be seen in FIG. 1B, the base 122 defines an opening 132 for the extendable cone 130 mounted on the base 122. As such, the opening 132 allows for mounting the extendable cone 130 to the base 122. Particularly, a periphery of the opening 132 is defined such that the extendable cone 130 may pass through the base 122.

Figure 2A:
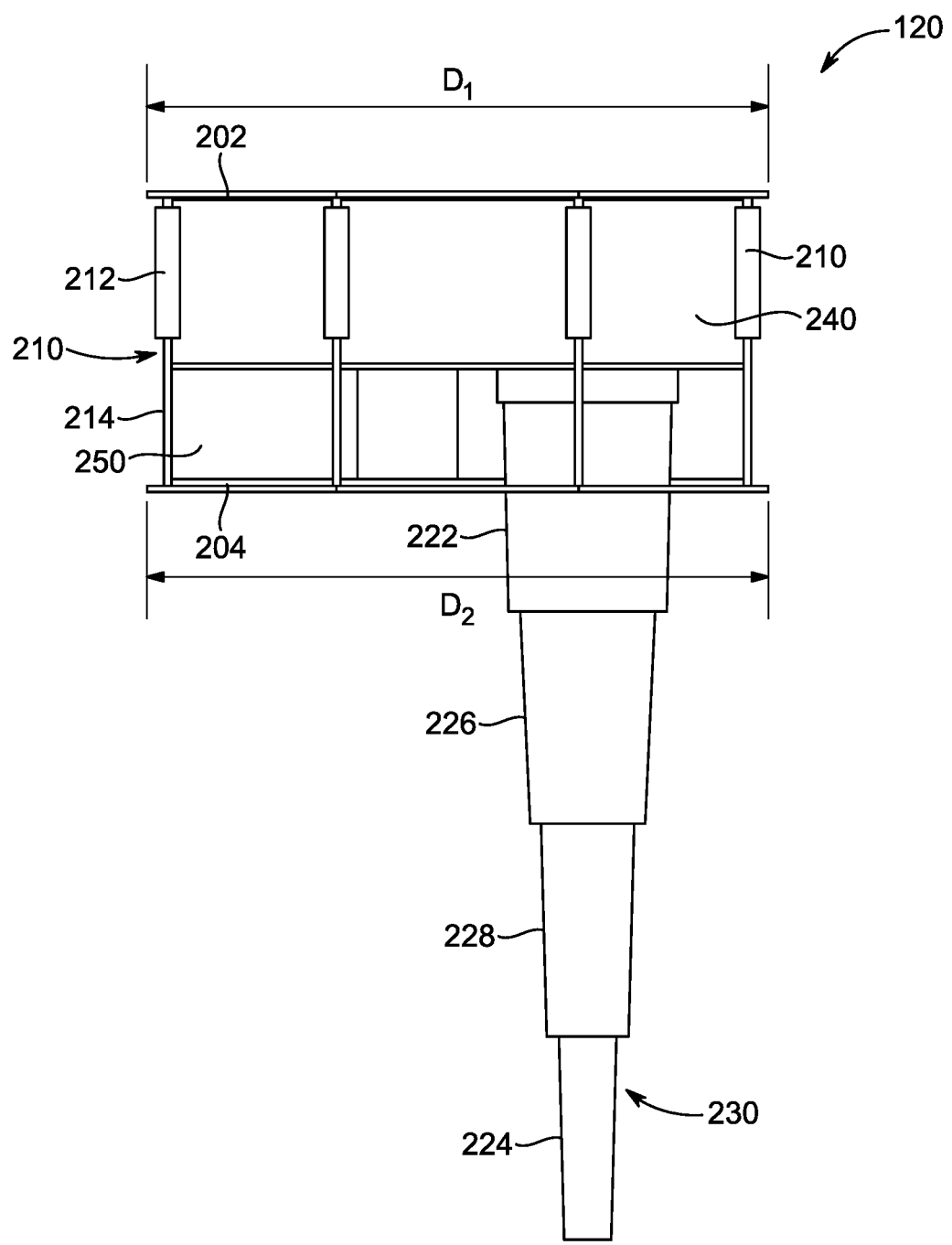
FIG. 2A is a side planar view of an air blowing device of the rotary-wing drone, according to certain embodiments.
Figure 2B:
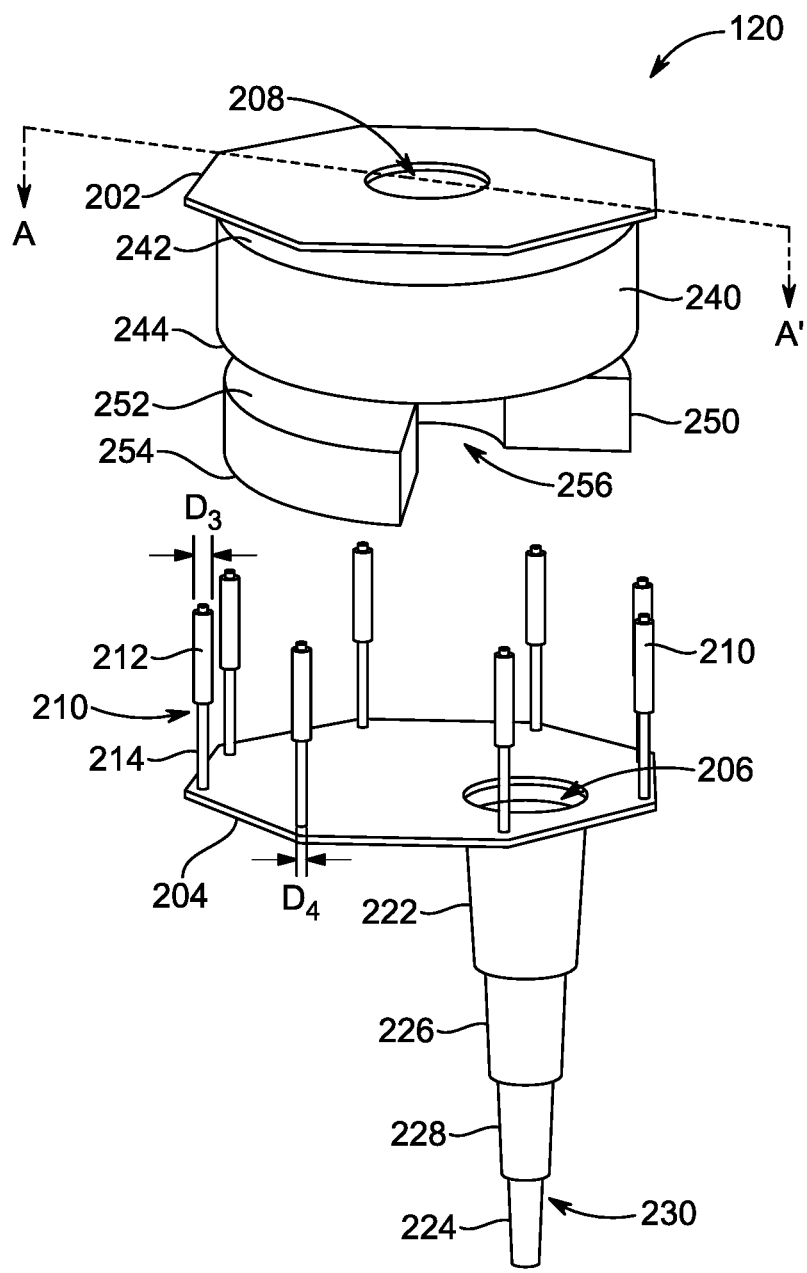
FIG. 2B is an exploded view of the air blowing device of FIG. 2A, according to certain embodiments.
Figure 2C:
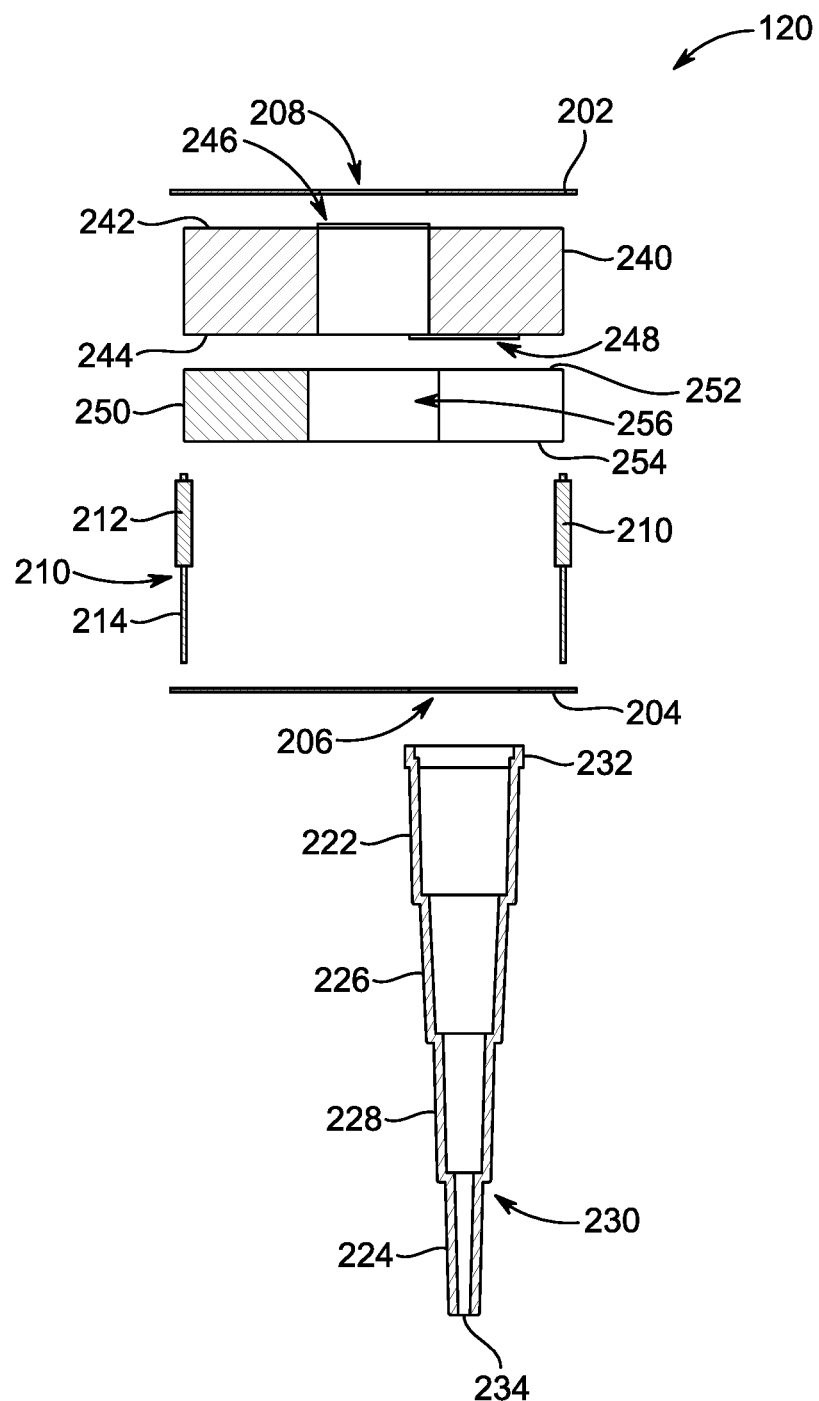
FIG. 2C is an exploded sectional view of the air blowing device considered along a section line A-A' in FIG. 2B, according to certain embodiments.

Referring to FIG. 2A, a side planar view of the air blowing device 120 is illustrated. Specifically, FIG. 2A illustrates an assembled configuration of the air blowing device 120. FIG. 2B is an exploded perspective view of the air blowing device 120 and FIG. 2C is an exploded sectional view of the air blowing device 120, considered along a section A-A' in FIG. 2B. As illustrated in FIGS. 2A-2C, the air blowing device 120 includes a top plate 202 and a bottom plate 204. The top plate 202 and the bottom plate 204 are alternatively referred to as "the cover 126" and "the base 122" (described in reference to FIGS. 1A-1B), respectively, in the present disclosure. The top plate 202 and the bottom plate 204 are in the center portion 124 (as shown in FIGS. 1A-1B) of the central body portion 102 (as shown in FIGS. 1A-1B) of the rotary-wing drone 100. In FIG. 2B, the top plate 202 and the bottom plate 204 are shown to be in shapes of regular octagons. In general, the top plate 202 and the bottom plate 204 may have circular shapes; and in case with the present regular octagon shapes thereof, the top plate 202 and the bottom plate 204 define respective circular shapes as corresponding circumscribing circles therefor. In an aspect of the present disclosure, as shown in FIG. 2A, a first diameter '$D_1$' of the top plate 202 is substantially equal to a second diameter '$D_2$' of the bottom plate 204. The first diameter '$D_1$' of the top plate 202 is considered as a diameter of the circle circumscribing the regular octagon shape thereof, and, similarly, the second diameter '$D_2$' of the bottom plate 204 is considered as a diameter of the circle circumscribing the regular octagon shape thereof. In cases where each of the top plate 202 and the bottom plate 204 is embodied as a polygon, the respective dimensions '$D_1$' and '$D_2$' may refer to a distance between opposite sides of the polygon or distance between opposite vertices of the polygon. In some embodiments, shape of the top plate 202 may be different from that of the bottom plate 204. Further, as may be seen in FIG. 2B, the bottom plate 204 defines a first opening 206, alternatively referred to as the first opening 206 (described in reference to FIGS. 1A-1B), and the top plate 202 defines a second opening 208. The first opening 206 and the second opening 208 may or may not be axially aligned with each other in the air blowing device 120.

Further, the air blowing device 120 further includes one or more pillars 210 connecting the top plate 202 and the bottom plate 204, thereby separating the top plate 202 from the bottom plate 204 by a predefined distance. In a non-limiting example, the number of pillars 210 may depend on the diameters '$D_1$', '$D_2$' of the top plate 202 and the bottom plate 204, respectively. For instance, with the regular octagon shapes of the top plate 202 and the bottom plate 204, eight number of pillars 210 may be used with each pillar 210 corresponding to one of eight sides of the regular octagon shapes of the top plate 202 and the bottom plate 204. The pillars 210 may have a certain height which separates and provides a gap between the top plate 202 and the bottom plate 204, and thereby define a space inside the air blowing device 120 to accommodate various components (as described further) thereof. It is anticipated that the height of the pillars 210 may be predefined to define a volume of the space in the air blowing device 120, depending on size of the various components to be accommodated therein. In an aspect of the present disclosure, each of the one or more pillars 210 includes an upper portion 212 and a lower portion 214. In the illustrated embodiment, a lateral cross-sectional area of each of the one or more pillars 210 may very along a length thereof, to define the upper portion 212 and the lower portion 214. Further, in an aspect of the present disclosure, a third diameter '$D_3$' of the upper portion 212 of each of the one or more pillars 210 is larger than a fourth diameter '$D_4$' of the lower portion 214 of each of the one or more pillars 210. That is, the lateral cross-sectional area of the upper portion 212 of the pillars 210 is larger than the lateral cross-sectional area of the lower portion 214 of the pillars 210, thereby imparting a stepped shape to the pillars 210. In some embodiments, the pillars 210 may be fastened to the top plate 202 and the bottom plate 204.

The extendable cone 130 includes one or more truncated conical sections. In the illustrated embodiment of FIG. 2A, the extendable cone 130 includes four numbers of truncated conical sections, namely, 222, 224, 226, 228. However, it will be understood that the illustrated number of truncated conical sections should not be considered limiting. In particular, the one or more truncated conical sections include, namely, a first section 222, a second section 224, a third section 226, a fourth section 228; with the first section 222 having a largest diameter out of the truncated conical sections 222, 224, 226, 228, the third section 226 having relatively smaller diameter than the first section 222, the fourth section 228 having relatively smaller diameter than the third section 226, and the second section 224 having a smallest diameter out of the truncated conical sections 222, 224, 226, 228. Further, it may be appreciated that the diameters of the truncated conical sections 222, 224, 226, 228 may be based on a size of the rotary-wing drone 100. Such design imparts a telescopic (collapsible) configuration to the extendable cone 130 in which the truncated conical sections 222, 224, 226, 228 may extend relative to each other and retract to be nested within an immediate adjacent truncated conical section. The one or more truncated conical sections 222, 224, 226, 228 are configured to nest such that the first section 222 with the largest diameter is on the outside and the second section 228 with the smallest diameter is on the inside when nested (as shown in FIG. 4B). Also, as depicted in FIGS. 2A-2C, the one or more truncated conical sections 222, 224, 226, 228 form a cone shaped extension (generally represented by reference numeral 230) when extended. In the cone shaped extension 230, as better shown in FIG. 2C, the truncated conical sections 222, 224, 226, 228 are arranged with the first section 222 arranged to define a top 232 of the cone shaped extension 230, the third section 226 arranged relatively below the first section 222, the fourth section 228 arranged relatively below the third section 226, and the second section 224 arranged relatively below the fourth section 228 and defining a bottom 234 of the cone shaped extension 230.

Referring to FIG. 2B, the air blowing device 120 further includes a centrifugal propeller unit 240 mounted to the top plate 202. Preferably, the centrifugal propeller unit 240 is mounted below the top plate 202. In the example illustrations of FIGS. 2A-2C, the centrifugal propeller unit 240 is illustrated to be housed between the top plate 202 and the bottom plate 204 of the air blowing device 120. In an aspect of the present disclosure, as better shown in the assembled depiction of the air blowing device 120 of FIG. 2A, the centrifugal propeller unit 240 is surrounded by the upper portions 212 of the one or more pillars 210. That is, the centrifugal propeller unit 240 is supported all along its lateral periphery by the upper portions 212 of the one or more pillars 210 within the space defined between the top plate 202 and the bottom plate 204 of the air blowing device 120.

For the purposes of the present disclosure, the term "centrifugal propeller unit" refers to a machine (like a pump or a motor) which increases pressure of a compressible fluid from an inlet to an outlet, by imparting to the compressible fluid the energy necessary for the change in pressure. In an aspect of the present disclosure, the centrifugal propeller unit 240 includes a propeller (shown in FIG. 3 as propeller 312) and a motor (shown in FIG. 3 as motor 310) configured to drive the propeller. Such configuration for the centrifugal propeller unit 240 may be contemplated by a person skilled in the art. In the centrifugal propeller unit 240, the driving (rotation) of the propeller (propeller 312 of FIG. 3), in the form of blades, by the motor (such as, the motor 310 of FIG. 3) generates pressurized air therein. In an example, the propeller 312 used in the centrifugal propeller unit 240 may include 20 to 30 blades. As shown in FIGS. 2B and 2C, the centrifugal propeller unit 240 has an upper surface 242 and a lower surface 244. The upper surface 242 of the centrifugal propeller unit 240 is disposed in contact with the top plate 202. The centrifugal propeller unit 240 may have an intake opening 246 (as shown in FIG. 2C) formed coaxial with an axis of rotation of the propeller, which is usually diagonal center of the centrifugal propeller unit 240. The intake opening 246 may be in the form of a hole defined in the upper surface 242. As per the present embodiments, with the centrifugal propeller unit 240 mounted below the top plate 202, the intake opening 246 may be disposed coaxial with the second opening 208 defined in the top plate 202 for suction of air from the environment. Further, the centrifugal propeller unit 240 may have an outlet opening 248 (as shown in FIG. 2C) formed close to a periphery of the propeller. The outlet opening 248 may be in the form of a hole defined in the lower surface 244. The outlet opening 248 may be disposed coaxial with the first opening 206 in the bottom plate 204 to be used to egress the generated pressurized air in the form of a pressurized air stream from the centrifugal propeller unit 240. In some embodiments the centrifugal propeller unit may include an axial fan, a propeller fan, a centrifugal (radial) fan, a mixed flow fan.

The outlet opening 248 is illustrated offset with respect to the intake opening 246 due to the positioning of the extendable cone 130. Such arrangement should not be considered limiting. In some embodiments, the extendable cone 130 may be centrally located with respect to a central longitudinal axis of the rotary-wing drone 100 and, as such, the outlet opening 248 may also be centrally located to be in fluid communication with the extendable cone 130.

The air blowing device 120 further includes one or more batteries 250 electrically connected to the motor (such as, the motor 310 of FIG. 3) and disposed between the centrifugal propeller unit 240 and the bottom plate 204. As illustrated, the one or more batteries 250 may be a unitary structure, such as a battery pack, also simply referred to as battery; and hereinafter the terms "one or more batteries" and "battery" have been interchangeably used. The battery 250 may have an upper surface 252 and a lower surface 254. The upper surface 252 of the battery 250 is disposed in contact with the lower surface 244 of the centrifugal propeller unit 240; and the lower surface 254 of the battery 250 is disposed in contact with the bottom plate 204, in the air blowing device 120. In an aspect of the present disclosure, as better shown in the assembled view of the air blowing device 120 in FIG. 2A, the one or more batteries 250 are surrounded by the lower portions 214 of the one or more pillars 210. That is, the battery 250 is supported all along its lateral periphery by the lower portions 214 of the one or more pillars 210 within the space defined between the top plate 202 and the bottom plate 204 of the air blowing device 120. In the example illustrations of FIGS. 2A-2C, the battery 250 is depicted to have a generally 'C' shape, with a lateral periphery of the battery 250 conforming to the lateral periphery of the space between the top plate 202 and the bottom plate 204 of the air blowing device 120. Such shape of the battery 250 defines a through-hole 256 (as shown in FIGS. 2B and 2C) in the battery 250, which may be disposed coaxial with the first opening 206 defined in the bottom plate 204 and the outlet opening 248 of the centrifugal propeller unit 240, to allow for egress of the generated pressurized air in the form of a pressurized air stream out from the centrifugal propeller unit 240 to outside of the air blowing device 120.

In an aspect of the present disclosure, the cone shaped extension 230 is connected to the centrifugal propeller unit 240 and extends through the bottom plate 204. In particular, the cone shaped extension 230 may be connected to the lower surface 244 of the centrifugal propeller unit 240 and extends through the first opening 206 defined in the bottom plate 204. Specifically, the top 232 (see FIG. 2C) of the cone shaped extension 230 may be connected to the lower surface 244 of the centrifugal propeller unit 240 and the one or more truncated conical sections 222, 224, 226, 228 of the extendable cone 130 may be disposed in fluid communication with the outlet opening 248 of the centrifugal propeller unit 240. Such arrangement allows the generated pressurized air from the centrifugal propeller unit 240 to channel through the top 232 to the bottom 234 of the cone shaped extension 230; and with the decreasing diameter of the cone shaped extension 230, the pressure of the air flowing therethrough increases further.

In an alternate embodiment, the components of the air blowing device 120 may be re-arranged without departing from the spirit and the scope of the present disclosure. For instance, in an example, the battery 250 may be mounted to the top plate 202 and the centrifugal propeller unit 240 may be disposed between the battery 250 and the bottom plate 204. The battery 250 may define the through-hole 256 coaxial with respect to the second opening 208 in the top plate 202, the centrifugal propeller unit 240 may define the intake opening 246 coaxial with respect to the through-hole 256 to cause the centrifugal propeller unit 240 to suction air from the environment, and the outlet opening 248 may be located coaxial with respect to the first opening 206 defined in the bottom plate 202 to supply the generated pressurized air. Further, the cone shaped extension 230 may be fluidly connected at the outlet opening 248 of the centrifugal propeller unit 240 to receive the generated pressurized air and extend through the first opening 206 defined in the bottom plate 202 to channel the pressurized air stream to a surface, for example a solar panel.

Figure 3:
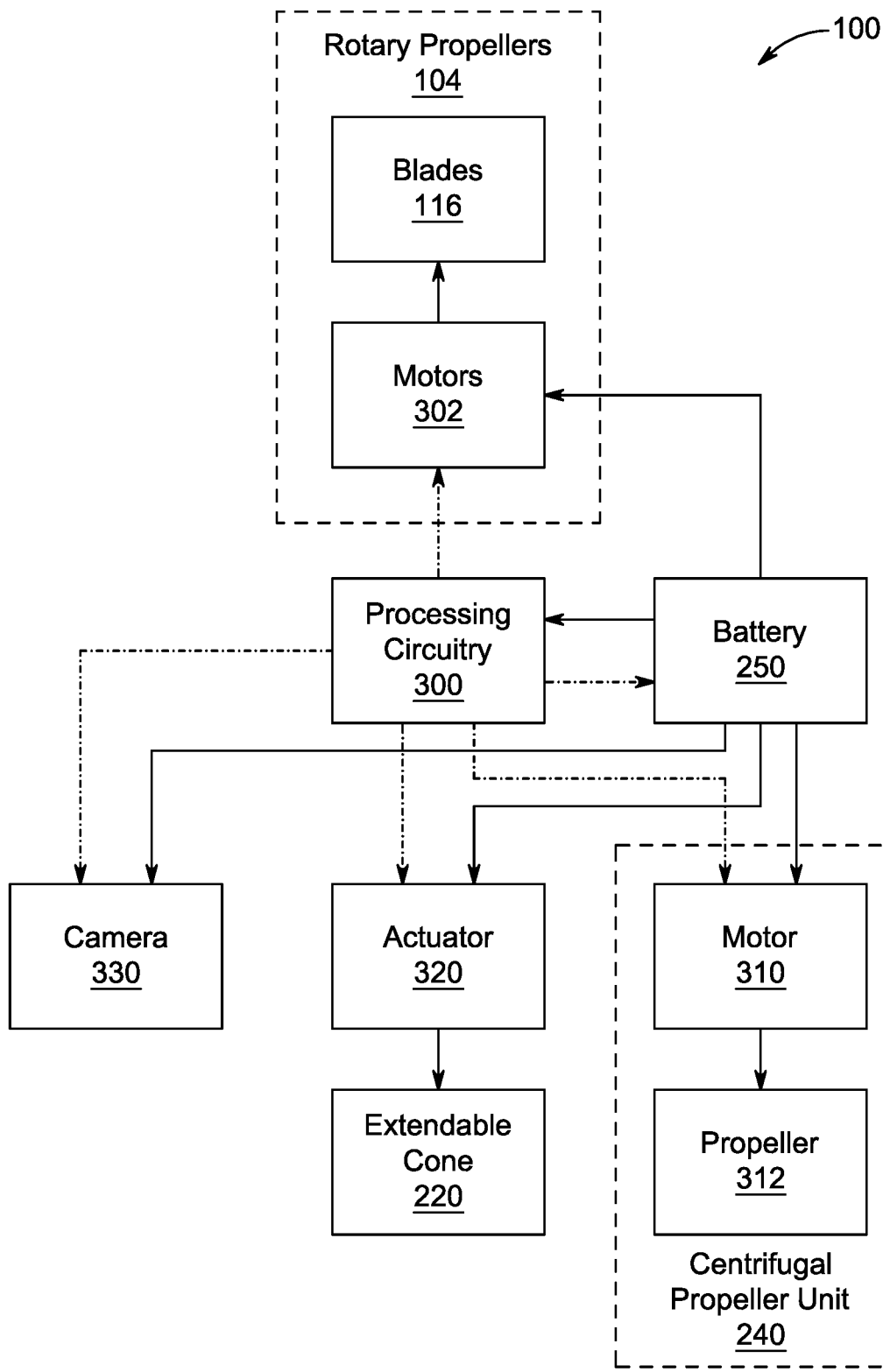
FIG. 3 is an exemplary block diagram of a circuit for the rotary-wing drone, according to certain embodiments.

Referring to FIG. 3, an exemplary block diagram of a circuit for the rotary-wing drone 100 is illustrated. The illustrated circuit (also represented by the reference numeral 100) utilizes solid lines to represent connections for transferring electrical power and dotted-dashed lines to represent connections for transferring communication signals. As illustrated, the rotary-wing drone 100 includes a processing circuitry 300. In an embodiment, the processing circuitry 300 may be powered by the battery 250. In an aspect, the processing circuitry 300 may be located in the air blowing device 120. It may be appreciated that the processing circuitry 300 may be in the form of a controller (such as the controller 700 in FIG. 7) which may be any processing device, system, or part thereof that controls at least one operation of the rotary-wing drone 100 and/or the air blowing device 120. Such controller may be implemented in hardware, firmware or software, or some combination. It should be noted that the functionality associated with any particular controller may be centralized or distributed, whether locally or remotely. Such controller may be a multi-core processor, a single core processor, or a combination of one or more multi-core processors and one or more single core processors. For example, the one or more processors may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like, implementing a memory. Further, the memory may include one or more non-transitory computer-readable storage media that can be read or accessed by other components in the device. The memory may be any computer-readable storage media, including volatile and/or non-volatile storage components, such as optical, magnetic, organic, or other memory or disc storage, which can be integrated in whole or in part with the device. In some examples, the memory may be implemented using a single physical device (e.g., optical, magnetic, organic, or other memory or disc storage unit), while in other examples, the memory may be implemented using two or more physical devices without any limitations.

In an aspect, the processing circuitry 300 may control operations of the rotary propellers 104. As shown, the processing circuitry 300 may be disposed in signal communication with the motors 302. The processing circuitry 300 may transmit independent control signals to one or more of the motors 302 for regulating (switch ON and OFF) respective rotations of the blades 116 of the rotary propellers 104 at any given instant and further control the battery 250 to independently regulate electrical power supply to each of the motors 302, and thereby control the rotary propellers 104, and thus control one or more of tilt angle of the rotary-wing drone 100, traveling direction of the rotary-wing drone 100, and traveling speed of the rotary-wing drone 100. Such arrangement may be contemplated by a person skilled in the art and thus has not been described further for the brevity of the present disclosure.

In an aspect, the processing circuitry 300 may control the operations of the centrifugal propeller unit 240 of the air blowing device 120. As illustrated in FIG. 3, the motor 310 is associated with the propeller 312, in the centrifugal propeller unit 240. The processing circuitry 300 may transmit control signals to regulate (switch ON and OFF) the motor 310 in the centrifugal propeller unit 240 and further control the battery 250 to regulate electrical power supply to the motor 310 to control rotation of the propeller 312, and thereby control blowing strength (output air thrust) of the air blowing device 120. Such arrangement may be contemplated by a person skilled in the art and thus has not been described further for the brevity of the present disclosure.

In an aspect, the processing circuitry 300 may control extension and retraction of the extendable cone 130. In an embodiment, an actuator 320 may be associated with the extendable cone 130 to cause the extension and retraction of the extendable cone 130, specifically controlling linear inward movement and outward movement of the one or more truncated conical sections 222, 224, 226, 228 therein. As used herein, the term "inward movement" refers to the movement of each of the truncated conical sections 222, 224, 226, 228 to achieve a nested configuration (shown in FIG. 4A) and the term "outward movement" refers to the movement of each of the truncated conical sections 222, 224, 226, 228 in a direction away from the centrifugal propeller unit 240 to achieve an extended configuration (shown in FIG. 4B). The actuator 320 may be a linear actuator or the like as known in the art. The processing circuitry 300 may transmit control signals to regulate (switch ON and OFF) the actuator 320 and further control the battery 250 to regulate electrical power supply to the actuator 320, and thereby control the extension (to form the cone shaped extension 230) and retraction (to nest the truncated conical sections 222, 224, 226, 228) of the extendable cone 130. In some examples, the actuator 320 may further be configured to change an angle of the cone shaped extension 230 with respect to the bottom plate 204, and thus a blowing angle of the air blowing device 120. Such configuration of the actuator 320 may be contemplated (such as, by using a ball and socked joint, or the like) and thus has not been described further for the brevity of the present disclosure.

Figure 4A:
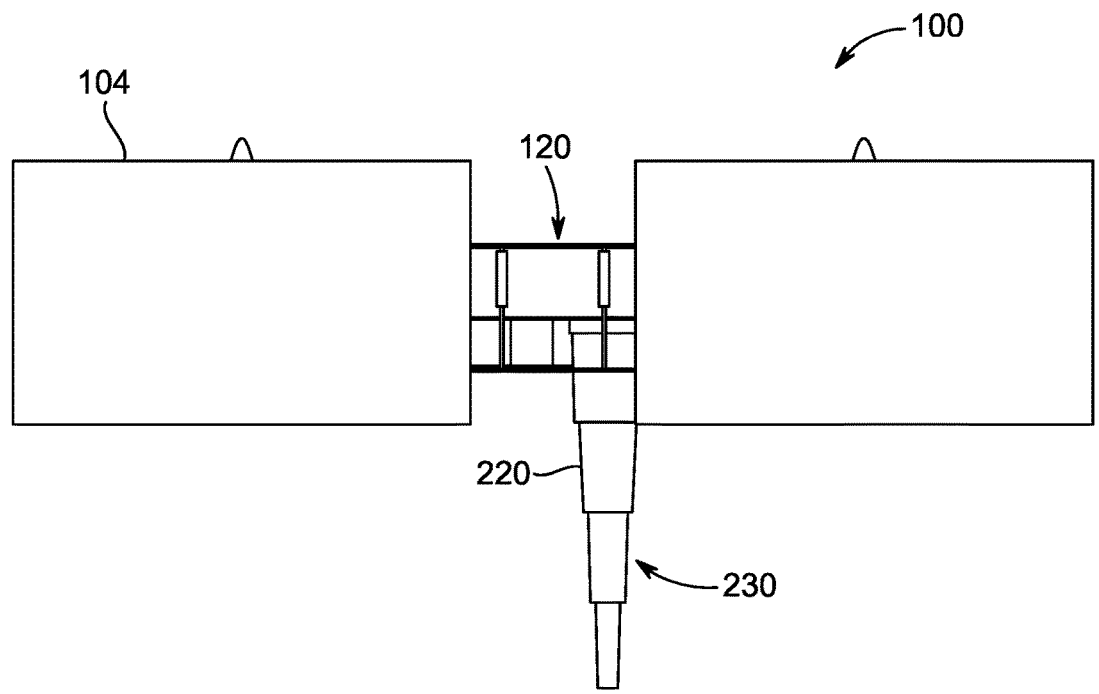
FIG. 4A is a side planar view of the rotary-wing drone depicting an extendable cone of the air blowing device in an extended configuration thereof, according to certain embodiments.
Figure 4B:
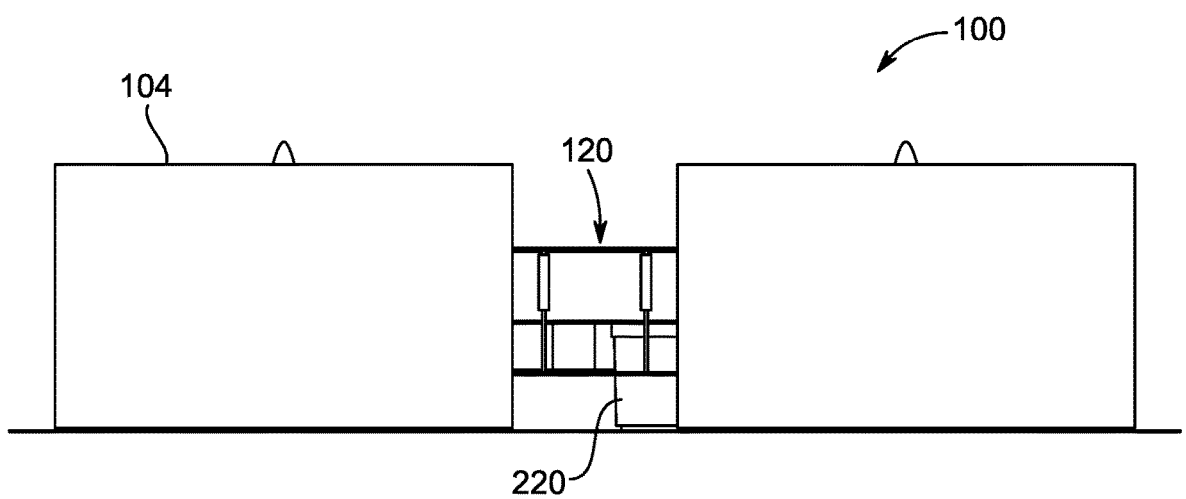
FIG. 4B is a side planar view of the rotary-wing drone depicting the extendable cone of the air blowing device in a retracted configuration thereof, according to certain embodiments.

FIG. 4A is a side planar view of the rotary-wing drone 100 illustrating the extended configuration of the extendable cone 130 of the air blowing device 120. FIG. 4B is a side planar view of the rotary-wing drone 100 illustrating the retracted configuration of the extendable cone 130 of the air blowing device 120. The extendable cone 130 is disposed in the extended configuration thereof to form the cone shaped extension 230, when the air blowing device 120 is employed for blowing air in the form of the pressurized air stream (as discussed earlier). Such use of the extendable cone 130 in the extended configuration would be required for some applications, as discussed later in the disclosure. Further, it may be appreciated that when the rotary-wing drone 100 may be in flight, it may be required to dispose the extendable cone 220 in the retracted configuration, such that extendable cone 130 may not cause drag during the flight of the rotary-wing drone 100; and further to avoid any damage and/or dislodging of the extendable cone 130 due to various forces acting thereon during the flight of the rotary-wing drone 100.

Referring back to FIG. 3, in an aspect of the present disclosure, the rotary-wing drone 100 further includes a camera 330 configured to obtain images of surrounding environment of the air blowing device 120 and the rotary-wing drone 100. In an aspect, the camera 330 may be located on the air blowing device 120. In other words, the air blowing device 120 includes the camera 330 configured to obtain images of surrounding environment of the air blowing device 120 and the rotary-wing drone 100. It may be appreciated that the camera 330 may be positioned on the bottom plate 204 in the air blowing device 120, pointing generally downwards therefrom. The term, "camera" as used herein, refers to any image acquisition device which is capable of receiving optical rays (stills, video) or electromagnetic radiation (RADAR based), reflected from a surface and generate a visible image of the surface. The camera 310 includes standard digital and non-digital cameras recording visible light as well as IR cameras, UV cameras, night vision cameras, thermal imaging cameras, x-ray cameras, gamma ray cameras, radio wave cameras, microwave cameras, radar, ultrasound, and any other imaging systems. In an aspect, the processing circuitry 300 may control operations of the camera 330. For instance, the processing circuitry 300 may transmit control signals to regulate (switch ON and OFF) the camera 330 and further control the battery 250 to regulate electrical power supply to the camera 330, and thereby control the camera 330 to capture (obtain) said images.

Figure 5:
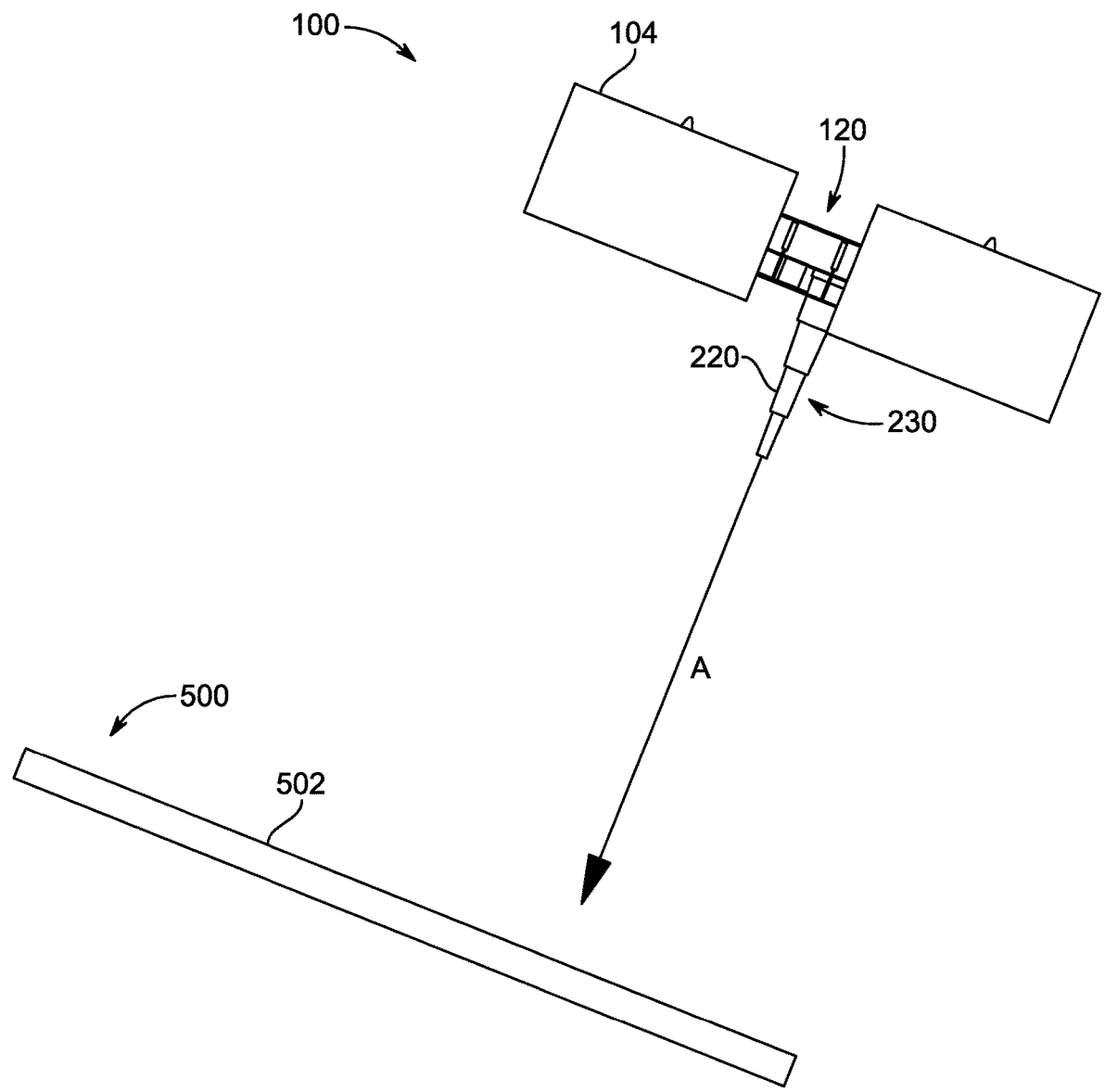
FIG. 5 is an exemplary illustration of the rotary-wing drone being utilized for cleaning a solar panel by blowing air by the air blowing device integrated therewith, according to certain embodiments.

The processing circuitry 300 is configured to analyze the images to obtain one or more parameters of the air blowing device 120 and the rotary-wing drone 100. In an aspect, the rotary-wing drone 100 of the present disclosure is implemented for cleaning of surfaces by blowing air by the air blowing device 120 integrated therewith. Particularly, the rotary-wing drone 100 of the present disclosure is implemented for cleaning of dust that may be accumulated over solar panels (as described above). FIG. 5 is an exemplary illustration of the rotary-wing drone 100 being utilized for cleaning a solar panel 500 by blowing air by the air blowing device 120 integrated therewith. To this end, the air blowing device 120 is alternatively referred to as "dust cleaning device". Specifically, the rotary-wing drone 100 is utilized for cleaning a surface 502 of the solar panel 500. The surface 502 is typically an exposed surface of the solar panel 500 on which the sunlight directly impinges, and exposed area of which in turn directly affects an efficiency of the solar panel 500.

Referring to FIGS. 3 and 5 in combination, in an aspect of the present disclosure, the analyzing the images includes determining an amount of dust on the solar panel 500, a type of the dust on the solar panel 500, and quality of the dust on the solar panel 500. The processing circuitry 300 is configured to determine the amount of dust on the solar panel 500, the type of the dust on the solar panel 500, and the quality of the dust on the solar panel 500, based on the analysis of the images. Particularly, the type and the quality of the dust may be determined based on, whether, the dust includes sand particles, mineral particles, metallic particles, organic particles, and the like. Further, the amount of dust may be determined based on how much of the area of the surface 502 of the solar panel 500 may be unexposed. In an aspect of the present disclosure, the processing circuitry 300 may further determine weather conditions based on the analyzed images of the surroundings. It may be contemplated by a person skilled in the art that such determinations may be made by using image processing algorithms, implementing machine learning and artificial intelligence techniques as known in the art and thus not described further herein for the brevity of the present disclosure.

As mentioned, the processing circuitry 300 analyzes the images to obtain one or more parameters of the air blowing device 120 and the rotary-wing drone 100. In an aspect of the present disclosure, the one or more parameters include blowing angle of the air blowing device 120, blowing strength of the air blowing device 120, tilt angle of the rotary-wing drone 100, traveling direction of the rotary-wing drone 100, and traveling speed of the rotary-wing drone 100. The parameters may include determined optimal values for one or more of blowing angle of the air blowing device 120, blowing strength of the air blowing device 120, tilt angle of the rotary-wing drone 100, traveling direction of the rotary-wing drone 100, and traveling speed of the rotary-wing drone 100 based on the analysis, which may enable the rotary-wing drone 100 to clean the solar panel 500, by removing accumulated dust from the surface 502 of the solar panel 500 by blowing air (represented by arrow 'A' in FIG. 5) thereon. For example, by changing the blowing angle of the air blowing device 120 (specifically, the cone shaped extension 230 therein), the accumulated dust located near periphery of the surface 502 may be forced to skid-off from nearest edge of the surface 502 of the solar panel 500. Similarly, by changing the blowing strength of the air blowing device 120, the accumulated dust that may be stuck (such as wet dust) may be forcibly removed from the surface 502 of the solar panel 500. Further, for example, by changing the tilt angle of the rotary-wing drone 100, the angle of the blown air with respect to the surface 502 of the solar panel 500 may be adjusted. Furthermore, by changing the traveling direction of the rotary-wing drone 100 and the traveling speed of the rotary-wing drone 100, the dust may be moved along with the blown air to be forced to skid-off from edge of the surface 502 of the solar panel 500 in the direction of travel of the rotary-wing drone 100. In an aspect of the present disclosure, the processing circuitry 300 may further control cleaning and other operations executed by the rotary-wing drone 100, including the one or more parameters of the air blowing device 120 and the rotary-wing drone 100 based on the determined weather conditions. For instance, if the determined weather conditions indicates that a sand-storm may have just passed by, then the processing circuitry 300 may execute the cleaning operation of the designated solar panels 500 using the rotary-wing drone 100.

In an embodiment, the rotary-wing drone 100 may be employed to clear the dust from surfaces of multiple solar panels disposed in a field dedicated for solar power harvest. In an implementation, multiple rotary-wing drones, each having the configuration of the rotary-wing drone 100, may be employed to clean the solar panels. In such implementations, each of the rotary-wing drones may be remotely controlled, and the processing circuitry 300 of each rotary-wing drone may be configured to receive signals from a remote control location. The signal may be indicative of a region that to be covered by the rotary-wing drone.

Figure 6:
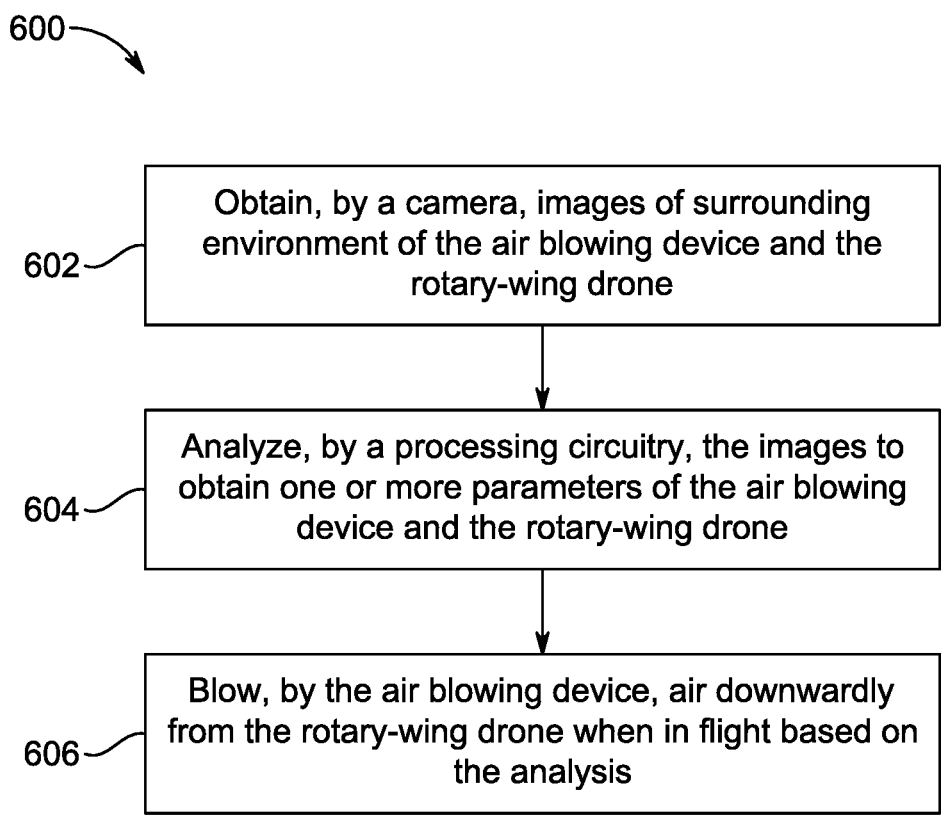
FIG. 6 is an exemplary flowchart of a method of blowing air by the air blowing device integrated with the rotary-wing drone, according to certain embodiments.

Referring to FIG. 6, an exemplary flowchart of a method 600 of blowing air by the air blowing device 120 integrated with the rotary-wing drone 100 is illustrated. The method 600 is described with reference to the rotary-wing drone 100 illustrated in FIG. 1A through FIG. 4B. The method 600 is further described with reference to FIG. 5 depicting the rotary-wing drone 100 being utilized for cleaning the solar panel 500 by blowing air by the air blowing device 120 integrated therewith.

At step 602, the method 600 includes obtaining, by the camera 330, images of surrounding environment of the air blowing device 120 and the rotary-wing drone 100. As discussed, the camera 330 may be controlled to determine instants when the camera 330 may capture (obtain) images. For example, the camera 330 may constantly monitor the surrounding and may capture image when a solar panel (such as, the solar panel 500) is in a field-of-view thereof. The captured images may further be sent to the processing circuitry 300 for further analysis.

At step 604, the method 600 includes analyzing, by the processing circuitry 300, the images to obtain one or more parameters of the air blowing device 120 and the rotary-wing drone 100. In an embodiment, analyzing the images may include utilizing image processing algorithms, implementing machine learning and artificial intelligence techniques as known in the art. The obtained parameters may include, but not limited to, determined optimal values which may be used by the air blowing device 120 and the rotary-wing drone 100.

In an aspect of the present disclosure, the analyzing the images includes determining an amount of dust on the solar panel 500, a type of the dust on the solar panel 500, and quality of the dust on the solar panel 500. That is, the processing circuitry 300 is configured to determine the amount of dust on the solar panel 500, the type of the dust on the solar panel 500, and the quality of the dust on the solar panel 500, based on the analysis of the images. Particularly, the type and the quality of the dust may be determined based on whether the dust includes sand particles, mineral particles, metallic particles, organic particles, and the like. Further, the amount of dust may be determined based on the area of the surface 502 of the solar panel 500 which is unexposed.

In an aspect of the present disclosure, the one or more parameters include blowing angle of the air blowing device 120, blowing strength of the air blowing device 120, tilt angle of the rotary-wing drone 100, traveling direction of the rotary-wing drone 100, and traveling speed of the rotary-wing drone 100. The parameters may include determined optimal values for one or more of blowing angle of the air blowing device 120, blowing strength of the air blowing device 120, tilt angle of the rotary-wing drone 100, traveling direction of the rotary-wing drone 100, and traveling speed of the rotary-wing drone 100 based on the analysis, which may enable the rotary-wing drone 100 to clean the solar panel 500, for example remove accumulated dust from the surface 502 of the solar panel 500 by blowing air 'A' (see FIG. 5) thereon.

At step 606, the method 600 includes blowing, by the air blowing device 120, air downwardly from the rotary-wing drone 100 when in flight based on the analysis. Particularly, blowing, by the air blowing device 120, air downwardly from the rotary-wing drone 100 when in flight based on the analysis involves using the obtained parameters (determined optimal values) for the operation of the air blowing device 120 and the rotary-wing drone 100 such that the blown air 'A' results in removal of accumulated dust from the surface 502 of the solar panel 500. The air blowing device 120 includes the top plate 202 and the bottom plate 204. The top plate 202 and the bottom plate 204 are in a center portion of the central body portion 102 of the rotary-wing drone 100. The bottom plate 204 includes a first opening 206. The air blowing device 120 further includes one or more pillars 210 connecting the top plate 202 and the bottom plate 204. The air blowing device 120 further includes the extendable cone 130 including the one or more truncated conical sections 222, 224, 226, 228. The one or more truncated conical sections 222, 224, 226, 228 are configured to nest such that the first section 222 with the largest diameter is on the outside and the second section 224 with the smallest diameter is on the inside when nested. The air blowing device 120 further includes the centrifugal propeller unit 240 mounted to the top plate 202. The centrifugal propeller unit 240 includes the propeller 312 and the motor 310 configured to drive the centrifugal propeller unit 240. The air blowing device 120 further includes the one or more batteries 250 electrically connected to the motor 310 and disposed between the centrifugal propeller unit 240 and the bottom plate 204. The one or more batteries 250 are surrounded by the lower portions 214 of the one or more pillars 210.

In an aspect of the present disclosure, the one or more pillars 210 separate the top plate 202 from the bottom plate 204. In an aspect of the present disclosure, each of the one or more pillars 210 includes the upper portion 212 and the lower portion 214. In an aspect of the present disclosure, the third diameter 'D$_3$' of the upper portion 212 of each of the one or more pillars 210 is larger than the fourth diameter 'D$_4$' of the lower portion 214 of each of the one or more pillars 210.

The rotary-wing drone 100 of the present disclosure is utilized for cleaning the solar panel 500 by blowing air by the air blowing device 120 integrated therewith. Specifically, the rotary-wing drone 100 is utilized for cleaning the surface 502 of the solar panel 500. The processing circuitry 300, by analyzing the images of the solar panel 500, obtain the one or more parameters of the air blowing device 120 and the rotary-wing drone 100 which allows for efficient operation of the rotary-wing drone 100 for its purposes of cleaning the solar panel 500. The configuration of the extendable cone 130, such as expansion and retraction, allows selective deployment of the cone shaped extension 230 during flight and during landing, thereby eliminating possible damage to the rotary-wing drone 100.

The rotary-wing drone 100 of the present disclosure provides a waterless, cordless, and fully automated cleaning system. The rotary-wing drone 100 of the present disclosure may be automated or piloted by a user. The integrated air blowing device 120 in the rotary-wing drone 100 provides high velocity air streams through the centrifugal propeller unit 240. The direction of the air blowing device 210 may generally be fixed and can be selectively adjusted indirectly through changing the flying angle of the rotary-wing drone 100 horizontally or vertically. The air blowing device 210 is equipped with the battery 250 (as being in the central body portion 102), which may also provide power for operations of other components of the rotary-wing drone 100. The battery 250 may be charged wirelessly.

The present disclosure provides a programmable, fully automated system that works at different scales. In solar farms for example, several rotary-wing drones 100 may be utilized. A control system may be developed to set the required flying and movement parameters with regard to the locations, tilt angles and other parameters of the solar panels 500. Further, the rotary-wing drone 100 is supported with the camera 330 that feeds the processing circuitry 300 that analyzes the amount, rate, and quality of the deposited dust to coordinate it with the blowing angle, period, etc. As discussed, the tilt angle can be adjusted through the rotary propellers 104 and should be determined in coordination with the tilt angle of the solar panel 500 among other parameters such as the desired direction of dust accumulation after removal. It may be understood that no part of the present rotary-wing drone 100 comes in direct contact with the solar panel 500 during operation. The present rotary-wing drone 100 can operate during day or nighttime, without requiring any manual labor. The present rotary-wing drone 100 helps to improve the efficiency of the solar panels 500 cleaned thereby. The present rotary-wing drone 100 can be programmed for automated charging and may be charged using converted solar energy from the solar panels 500 cleaned thereby. The present rotary-wing drone 100 can be operated and can be programmed for cleaning rate and performance. The functionality of the rotary-wing drone 100 with respect to the cleaning, charging, and flying process may be programmed and can also follow certain weather conditions (as required).

For the purposes of the present disclosure, a size of the rotary-wing drone 100 may be estimated and calculated with respect to the size and weight of the air blowing device 120, especially the battery 250 which may be varied based on typical duration of its operation. The calculation of the drone flight time may be determined using equation:

$$\text{Time} = \frac{\text{Capacity} * \text{Discharge}}{AAD}$$

where, Time is the flight time of the rotary-wing drone 100 expressed in hours, Capacity is the capacity of the battery 250 expressed in milliamp hours (mAh) or amp hours (Ah), Discharge is the battery discharge that is allowed for during the flight, and AAD is the average amp draw of the rotary-wing drone 100, calculated in amperes.

Further, the calculation of the average amp draw (AAD) may be determined using equation:

$$AAD = \frac{AUW * P}{V}$$

where, AUW is the total weight of the rotary-wing drone 100, including the battery, measured in kilograms, P is the power required to lift one kilogram of equipment, expressed in watts per kilogram, and V is the battery voltage expressed in volts. Moreover, the "P/V" in the equation is the definition of an electric current T according to Ohm's law, where 'I' stands for the current (in amps) required to lift one kilogram into the air for the present rotary-wing drone 100.

The first embodiment of the present disclosure is illustrated with respect to FIG. 1A through FIG. 5. The first embodiment describes the rotary-wing drone 100. The rotary-wing drone 100, comprising the central body portion 102, the plurality of rotary propellers 104 mounted at the periphery of the central body portion 102, the air blowing device 120 configured to blow air downwardly from the rotary-wing drone 100 when in flight, wherein the air blowing device 120 comprises the top plate 202 and the bottom plate 204, the top plate 202 and the bottom plate 204 being in the center portion 124 of the central body portion 102 of the rotary-wing drone 100, the bottom plate 204 including the first opening 206, one or more pillars 210 connecting the top plate 202 and the bottom plate 204, the extendable cone 130 comprising one or more truncated conical sections 222, 224, 226, 228, wherein the one or more truncated conical sections 222, 224, 226, 228 are configured to nest such that the first section 222 with the largest diameter is on the outside and the second section 224 with the smallest diameter is on the inside when nested, the centrifugal propeller unit 240 mounted to the top plate 202, the centrifugal propeller unit 240 comprising the propeller 312 and the motor 310 configured to drive the propeller 312, and one or more batteries 250 electrically connected to the motor 310 and disposed between the centrifugal propeller unit 240 and the bottom plate 204, the one or more batteries 250 surrounded by the lower portions 214 of the one or more pillars 210, the camera 330 configured to obtain images of surrounding environment of the air blowing device 120 and the rotary-wing drone 100, and the processing circuitry 300 configured to analyze the images to obtain one or more parameters of the air blowing device 120 and the rotary-wing drone 100.

Each of the plurality of rotary propellers 104 has the same diameter '$D_R$'. The first diameter '$D_1$' of the top plate 202 is the same as the second diameter '$D_2$' of the bottom plate 204. The analyzing the images includes determining the amount of dust on the solar panel 500, the type of the dust on the solar panel 500, and quality of the dust on the solar panel 500. The one or more parameters include blowing angle of the air blowing device 120, blowing strength of the air blowing device 120, tilt angle of the rotary-wing drone 100, traveling direction of the rotary-wing drone 100, and traveling speed of the rotary-wing drone 100. The one or more pillars 210 separate the top plate 202 from the bottom plate 204. Each of the one or more pillars 210 includes the upper portion 212 and the lower portion 214. The third diameter '$D_3$' of the upper portion 212 of each of the one or more pillars 210 is larger than the fourth diameter '$D_4$' of the lower portion 214 of each of the one or more pillars 210. The one or more truncated conical sections 222, 224, 226, 228 form the cone shaped extension 230 when extended. The cone shaped extension 230 is connected to the top plate 202 and extends through the bottom plate 204. The centrifugal propeller unit 240 is surrounded by the upper portions 212 of the one or more pillars 210.

Another embodiment of the present disclosure is illustrated with respect to FIG. 1A through FIG. 6. The second embodiment describes the method 600 of blowing air by the air blowing device 120 integrated with the rotary-wing drone 100. The method 600 comprising obtaining, by the camera 330, images of surrounding environment of the air blowing device 120 and the rotary-wing drone 100; analyzing, by the processing circuitry 300, the images to obtain one or more parameters of the air blowing device 120 and the rotary-wing drone 100; and blowing, by the air blowing device 120, air downwardly from the rotary-wing drone 100 when in flight based on the analysis, wherein the air blowing device 120 comprises the top plate 202 and the bottom plate 204, the top plate 202 and the bottom plate 204 being in the center portion 124 of the central body portion 102 of the rotary-wing drone 100, the bottom plate 204 including the first opening 206, one or more pillars 210 connecting the top plate 202 and the bottom plate 204, the extendable cone 130 comprising one or more truncated conical sections 222, 224, 226, 228, wherein the one or more truncated conical sections 222, 224, 226, 228 are configured to nest such that the first section 222 with the largest diameter is on the outside and the second section 224 with the smallest diameter is on the inside when nested, the centrifugal propeller unit 240 mounted to the top plate 202, the centrifugal propeller unit 240 comprising the propeller 312 and the motor 310 configured to drive the centrifugal propeller unit 240, and one or more batteries 250 electrically connected to the motor 310 and disposed between the centrifugal propeller unit 240 and the bottom plate 204, the one or more batteries 250 surrounded by the lower portions 214 of the one or more pillars 210.

Analyzing the images includes determining the amount of dust on the solar panel 500, the type of the dust on the solar panel 500, and quality of the dust on the solar panel 500.

The one or more parameters include blowing angle of the air blowing device 120, blowing strength of the air blowing device 120, tilt angle of the rotary-wing drone 100, traveling direction of the rotary-wing drone 100, and traveling speed of the rotary-wing drone 100. The one or more pillars 210 separate the top plate 202 from the bottom plate 204. Each of the one or more pillars 210 includes the upper portion 212 and the lower portion. The third diameter '$D_3$' of the upper portion 212 of each of the one or more pillars 210 is larger than the fourth diameter '$D_4$' of the lower portion 214 of each of the one or more pillars 210.

Another embodiment of the present disclosure is illustrated with respect to FIG. 1A through FIG. 5. The third embodiment describes the rotary-wing drone 100. The rotary-wing drone 100, comprising the central body portion 102, the plurality of rotary propellers 104 mounted at the periphery of the central body portion 102, the air blowing device 120 configured to blow air downwardly from the rotary-wing drone 100 when in flight, wherein the air blowing device 120 comprises the base 204 being in the center portion 124 of the central body portion 102 of the rotary-wing drone 100, the extendable cone 130 mounted to the base, the extendable cone 130 comprising one or more truncated conical sections 222, 224, 226, 228, wherein the one or more truncated conical sections 222, 224, 226, 228 are configured to nest such that the first section 222 with the largest diameter is on the outside and the second section 224 with the smallest diameter is on the inside when nested, the centrifugal propeller unit 240 on top of the base, the centrifugal propeller unit 240 comprising the propeller 312 and the motor 310 configured to drive the propeller 312, and one or more batteries 250 electrically connected to the motor 310 and disposed between the centrifugal propeller unit 240 and the base, the camera 330 configured to obtain images of surrounding environment of the air blowing device 120 and the rotary-wing drone 100, and the processing circuitry 300 configured to analyze the images to obtain one or more parameters of the air blowing device 120 and the rotary-wing drone 100.

The base 204 defines the opening 206 for the extendable cone 130 mounted on the base.

The one or more parameters include blowing angle of the air blowing device 120, blowing strength of the air blowing device 120, tilt angle of the rotary-wing drone 100, traveling direction of the rotary-wing drone 100, and traveling speed of the rotary-wing drone 100.

Figure 7:
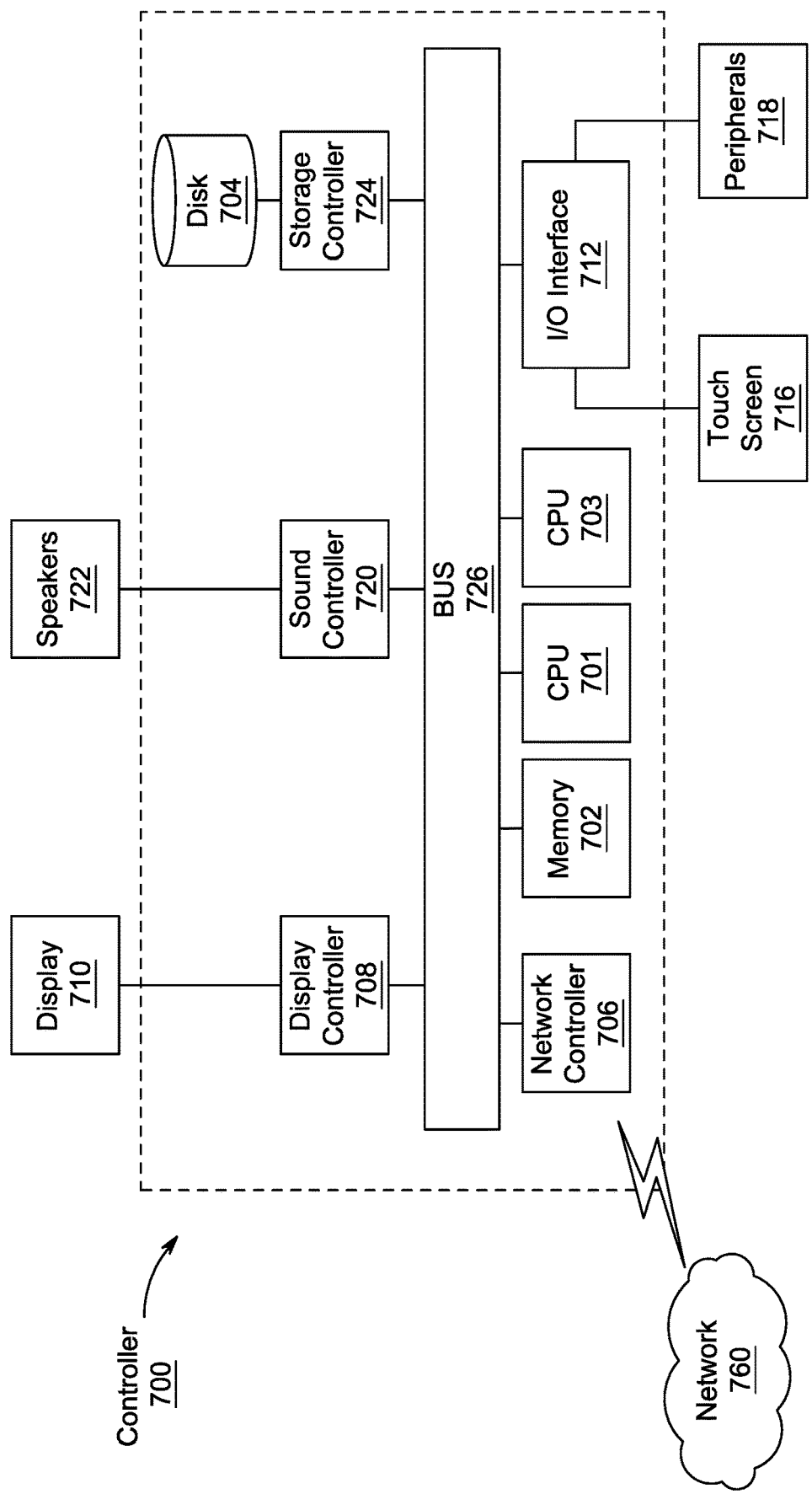
FIG. 7 is an illustration of a non-limiting example of details of computing hardware used in a processing circuitry of the rotary-wing drone, according to certain embodiments.

Next, further details of the hardware description of the processing circuitry 300 of FIG. 3 according to exemplary embodiments is described with reference to FIG. 7. In FIG. 7, a controller 700 is described is representative of the processing circuitry 300 of FIG. 3 in which the controller is a computing device which includes a CPU 701 which performs the processes described above/below. The process data and instructions may be stored in a memory 702. These processes and instructions may also be stored on a storage medium disk 704 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 701, 703 and an operating system such as Microsoft Windows 7, Microsoft Windows 10, UNIX, Solaris, LINUX, Apple MAC-OS, and other systems known to those skilled in the art.

The hardware elements in order to achieve the computing device may be realized by various circuitry elements, known to those skilled in the art. For example, the CPU 701 or the CPU 703 may be a Xenon or Core processor from Intel of America or an Opteron processor from AMD of America, or may be other processor types that would be recognized by one of ordinary skill in the art. Alternatively, the CPU 701, 703 may be implemented on an FPGA, ASIC, PLD or using discrete logic circuits, as one of ordinary skill in the art would recognize. Further, CPU 701, 703 may be implemented as multiple processors cooperatively working in parallel to perform the instructions of the inventive processes described above.

The computing device in FIG. 7 also includes a network controller 706, such as an Intel Ethernet PRO network interface card from Intel Corporation of America, for interfacing with network 760. As can be appreciated, the network 706 can be a public network, such as the Internet, or a private network such as an LAN or WAN network, or any combination thereof and can also include PSTN or ISDN sub-networks. The network 706 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 708, such as a NVIDIA GeForce GTX or Quadro graphics adaptor from NVIDIA Corporation of America for interfacing with display 710, such as a Hewlett Packard HPL2445w LCD monitor. A general purpose I/O interface 712 interfaces with a touch screen panel 716 on or separate from display 710. General purpose I/O interface also connects to a variety of peripherals 718 including printers and scanners, such as an OfficeJet or DeskJet from Hewlett Packard.

A sound controller 720 is also provided in the computing device such as Sound Blaster X-Fi Titanium from Creative, to interface with speakers/microphone 722 thereby providing sounds and/or music.

The general purpose storage controller 724 connects the storage medium disk 704 with communication bus 726, which may be an ISA, EISA, VESA, PCI, or similar, for interconnecting all of the components of the computing device. A description of the general features and functionality of the display 710, as well as the display controller 708, storage controller 724, network controller 706, sound controller 720, and general purpose I/O interface 712 is omitted herein for brevity as these features are known.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A rotary-wing drone, comprising:
a central body portion,
a plurality of rotary propellers mounted at a periphery of the central body portion,
an air blowing device configured to blow air downwardly from the rotary-wing drone when in flight, wherein the air blowing device comprises:
a top plate and a bottom plate, the top plate and the bottom plate being in a center portion of the central body portion of the rotary-wing drone, the bottom plate defines a first opening;
one or more pillars connecting the top plate and the bottom plate;
an extendable cone comprising one or more truncated conical sections, wherein the one or more truncated conical sections are configured to nest such that a first section with a largest diameter is on the outside and a second section with a smallest diameter is on the inside when nested;
a centrifugal propeller unit mounted to the top plate, the centrifugal propeller unit comprising a propeller and a motor configured to drive the propeller; and
one or more batteries electrically connected to the motor and disposed between the centrifugal propeller unit and the bottom plate, the one or more batteries surrounded by a lower portion of the one or more pillars;
a camera configured to obtain images of surrounding environment of the air blowing device and the rotary-wing drone; and
a processing circuitry configured to analyze the images to obtain one or more parameters of the air blowing device and the rotary-wing drone.

2. The rotary-wing drone of claim 1, wherein each of the plurality of rotary propellers has a same diameter.

3. The rotary-wing drone of claim 1, wherein a first diameter of the top plate is the same as a second diameter of the bottom plate.

4. The rotary-wing drone of claim 1, wherein the analyzing the images includes determining an amount of dust on a solar panel, a type of the dust on the solar panel, and quality of the dust on the solar panel.

5. The rotary-wing drone of claim 1, wherein the one or more parameters include blowing angle of the air blowing device, blowing strength of the air blowing device, tilt angle of the drone, traveling direction of the rotary-wing drone, and traveling speed of the rotary-wing drone.

6. The rotary-wing drone of claim 1, wherein the one or more pillars separate the top plate from the bottom plate.

7. The rotary-wing drone of claim 1, wherein each of the one or more pillars includes an upper portion and the lower portion.

8. The rotary-wing drone of claim 7, wherein a third diameter of the upper portion of each of the one or more pillars is larger than a fourth diameter of the lower portion of each of the one or more pillars.

9. The rotary-wing drone of claim 1, wherein the one or more truncated conical sections form a cone shaped extension when extended.

10. The rotary-wing drone of claim 9, wherein the cone shaped extension is connected to the centrifugal propeller unit and extends through the bottom plate.

11. The rotary-wing drone of claim 1, wherein the centrifugal propeller unit is surrounded by upper portions of the one or more pillars.

12. A method of blowing air by an air blowing device integrated with a rotary-wing drone, comprising:
obtaining, by a camera, images of surrounding environment of the air blowing device and the rotary-wing drone;
analyzing, by processing circuitry, the images to obtain one or more parameters of the air blowing device and the rotary-wing drone; and
blowing, by the air blowing device, air downwardly from the rotary-wing drone when in flight based on the analysis, wherein the air blowing device comprises:
a top plate and a bottom plate, the top plate and the bottom plate being in a center portion of a central body portion of the rotary-wing drone, the bottom plate defines a first opening, one or more pillars connecting the top plate and the bottom plate;

an extendable cone comprising one or more truncated conical sections, wherein the one or more truncated conical sections are configured to nest such that a first section with a largest diameter is on the outside and a second section with a smallest diameter is on the inside when nested;

a centrifugal propeller unit mounted to the top plate, the centrifugal propeller unit comprising a propeller and a motor configured to drive the propeller; and one or more batteries electrically connected to the motor and disposed between the centrifugal propeller unit and the bottom plate, the one or more batteries surrounded by lower portions of the one or more pillars.

13. The method of claim 12, wherein the analyzing the images includes determining an amount of dust on a solar panel, a type of the dust on the solar panel, and quality of the dust on the solar panel.

14. The method of claim 12, wherein the one or more parameters include blowing angle of the air blowing device, blowing strength of the air blowing device, tilt angle of the rotary-wing drone, traveling direction of the rotary-wing drone, and traveling speed of the rotary-wing drone.

15. The method of claim 12, wherein the one or more pillars separate the top plate from the bottom plate.

16. The method of claim 12, wherein each of the one or more pillars includes an upper portion and the lower portion.

17. The method of claim 16, wherein a third diameter of the upper portion of each of the one or more pillars is larger than a fourth diameter of the lower portion of each of the one or more pillars.

18. A rotary-wing drone, comprising:
a central body portion,
a plurality of rotary propellers mounted at a periphery of the central body portion,
an air blowing device configured to blow air downwardly from the rotary-wing drone when in flight, wherein the air blowing device comprises:
a base being in a center portion of the central body portion of the rotary-wing drone,
an extendable cone mounted to the base, the extendable cone comprising one or more truncated conical sections, wherein the one or more truncated conical sections are configured to nest such that a first section with a largest diameter is on the outside and a second section with a smallest diameter is on the inside when nested;
a centrifugal propeller unit on top of the base, the centrifugal propeller unit comprising a propeller and a motor configured to drive the propeller; and
one or more batteries electrically connected to the motor and disposed between the centrifugal propeller unit and the base;
a camera configured to obtain images of surrounding environment of the air blowing device and the rotary-wing drone, and
a processing circuitry configured to analyze the images to obtain one or more parameters of the air blowing device and the rotary-wing drone.

19. The rotary-wing drone of claim 18, wherein the base defines an opening for the extendable cone mounted on the base.

20. The rotary-wing drone of claim 18, wherein the one or more parameters include blowing angle of the air blowing device, blowing strength of the air blowing device, tilt angle of the rotary-wing drone, traveling direction of the rotary-wing drone, and traveling speed of the rotary-wing drone.

* * * * *